(12) United States Patent
Escalier (10) Patent No.: US 9,885,631 B2
(45) Date of Patent: Feb. 6, 2018

(54) OPTICAL INSTRUMENT FOR IDENTIFYING AND LOCATING MICRO-ETCHING ON AN OPHTHALMIC LENS

(71) Applicant: ESSILOR INTERNATIONAL (COMPAGNIE GENERALE D'OPTIQUE), Charenton-le-Pont (FR)

(72) Inventor: Guilhem Escalier, Charenton-le-Pont (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 0 days.

(21) Appl. No.: 15/120,817

(22) PCT Filed: Feb. 26, 2015

(86) PCT No.: PCT/FR2015/050465
§ 371 (c)(1),
(2) Date: Aug. 23, 2016

(87) PCT Pub. No.: WO2015/128589
PCT Pub. Date: Sep. 3, 2015

(65) Prior Publication Data
US 2016/0363506 A1 Dec. 15, 2016

(30) Foreign Application Priority Data
Feb. 27, 2014 (FR) .................................... 14 51614

(51) Int. Cl.
*G01M 11/02* (2006.01)
(52) U.S. Cl.
CPC .... *G01M 11/0257* (2013.01); *G01M 11/0264* (2013.01); *G01M 11/0278* (2013.01)

(58) Field of Classification Search
CPC ......... G01M 11/0257; G01M 11/0278; G01M 11/0214; G01M 11/0235; A61L 12/08; A61L 12/10; A61L 12/14
See application file for complete search history.

(56) References Cited

U.S. PATENT DOCUMENTS 3,549,237 A * 12/1970 Parrent, Jr. ............ G03B 15/00
353/20
6,301,005 B1 * 10/2001 Epstein .............. G01M 11/0278
356/124

(Continued)

FOREIGN PATENT DOCUMENTS

EP 0 856 728 A2 8/1998
EP 1 061 329 A2 12/2000

(Continued)

OTHER PUBLICATIONS

International Search Report PCT/FR2015/050466 dated May 26, 2015.

(Continued)

*Primary Examiner* — Sang Nguyen
(74) *Attorney, Agent, or Firm* — Young & Thompson (57) ABSTRACT

An optical instrument includes: a collimation element (30) having a focal distance; a point light source (25-27) with a wavelength of between 700 and 1000 nm and a diameter less than or equal to a fiftieth of the focal distance, placed at a first focus of the collimation element, so that the light becomes a beam (20) of collimated light; a backscatterer (12); a support for receiving an ophthalmic lens (14), with the collimation element, support and backscatterer being placed so that the beam of collimated light encounters the lens location (15) where micro-etching is present; an image analyzing element (32) and an image capture element (31) linked to the analyzing element and including an objective lens (35) placed at a second focus of the collimation ele- (Continued)

ment, which objective lens is developed to provide the analyzing element with images of the backscatterer in order to identify and locate the micro-etching.

20 Claims, 4 Drawing Sheets (56) References Cited

U.S. PATENT DOCUMENTS

| | | | |
|---|---|---|---|
| 6,888,626 B2* | 5/2005 | Levecq | G01M 11/0235 356/124 |
| 7,324,190 B2 | 1/2008 | Demarchi et al. | |
| 8,593,623 B2 | 11/2013 | Levecq et al. | |
| 8,823,926 B2* | 9/2014 | Hanssen | G01M 11/081 356/124 |
| 2003/0021376 A1* | 1/2003 | Smith | G01N 23/04 378/98.8 |
| 2006/0170865 A1* | 8/2006 | Hirohara | A61B 3/0025 351/205 |
| 2006/0192945 A1 | 8/2006 | Hornauer et al. | |
| 2007/0091262 A1 | 4/2007 | Watanabe et al. | |
| 2010/0020406 A1* | 1/2010 | Rana | G02B 25/04 359/643 |
| 2014/0254004 A1* | 9/2014 | Wooder | G02B 21/12 359/385 |
| 2014/0257076 A1* | 9/2014 | Shimozato | A61B 3/165 600/401 |
| 2015/0002656 A1* | 1/2015 | Dubois | G01M 11/0207 348/95 |

FOREIGN PATENT DOCUMENTS

| | | |
|---|---|---|
| EP | 1 093 907 A2 | 4/2001 |
| EP | 1 613 450 B1 | 6/2006 |
| EP | 1 739 472 A1 | 1/2007 |
| EP | 1 997 585 A1 | 12/2008 |
| EP | 2 239 552 A1 | 10/2010 |
| FR | 2 825 466 A1 | 12/2002 |
| WO | 95/34800 A1 | 12/1995 |

OTHER PUBLICATIONS

International Search Report, dated May 22, 2015, from corresponding PCT application.

* cited by examiner

OPTICAL INSTRUMENT FOR IDENTIFYING AND LOCATING MICRO-ETCHING ON AN OPHTHALMIC LENS

FIELD OF THE INVENTION

The invention relates to optical instruments for identifying and localizing micro-engravings present on an ophthalmic lens.

PRIOR ART

As is known, micro-engravings are small local variations in lens thickness or small local variations in refractive index that serve to pinpoint characteristic points of an ophthalmic lens, for example its prism reference point (PRP).

When a light beam encounters a micro-engraving, its phase is modified locally by the micro-engraving.

One of the techniques allowing micro-engravings to be viewed is the phase-contrast technique, which is based on diffraction of the light beam, which diffraction is caused by the local phase variation that occurs when a coherent light beam encounters a micro-engraving. More precisely, the light beam employed is spatially coherent. The diffraction is made visible by a local intensity modification (Fresnel diffraction).

From European patent applications EP 1 613 450 and EP 1 739 472, an optical instrument is already known including, in order to allow micro-engravings present on a face of an ophthalmic lens to be viewed:

- a point light source;
- a collimating member, said point light source being placed at a first focal point of this collimating member so that light issued from the point light source becomes, after having passed through the collimating member, a beam of collimated light;
- a reflector of light;
- a holder configured to hold the ophthalmic lens between the collimating member and the reflector of light in a position in which that face of the ophthalmic lens on which the micro-engravings are present is facing the collimating member; the collimating member, the holder and the reflector being placed so that the beam of collimated light issued from the collimating member encounters that face of the ophthalmic lens on which the micro-engravings are present, passes through the ophthalmic lens, encounters the reflector, returns toward the ophthalmic lens and once again passes through the ophthalmic lens then the collimating member;
- a displaying unit; and
- an image-capturing unit connected to the displaying unit, which image-capturing unit includes an objective placed at a second focal point of the collimating member, which objective is focused on that face of the ophthalmic lens on which the micro-engravings are present so that the images displayed by the displaying unit connected to the image-capturing unit contain a representation of the micro-engravings allowing the micro-engravings to be identified and localized.

SUBJECT OF THE INVENTION

The invention aims to provide an instrument of the same type having a better performance.

To this end, it proposes an optical instrument for identifying and localizing micro-engravings present on an ophthalmic lens, including:

- a point light source;
- a collimating member, said point light source being placed at a first focal point of said collimating member so that light issued from said point light source becomes, after having passed through said collimating member, a beam of collimated light;
- a member for sending back light;
- a holder configured to hold said ophthalmic lens between said collimating member and said member for sending back light; said collimating member, said holder and said member for sending back light are placed so that the beam of collimated light issued from said collimating member encounters the location on the ophthalmic lens where micro-engravings are present, passes through said ophthalmic lens, encounters said member for sending back light, returns toward said ophthalmic lens and once again passes through said ophthalmic lens then said collimating member;
- an image-exploiting unit; and
- an image-capturing unit connected to said image-exploiting unit, which image-capturing unit includes an objective placed at a second focal point of said collimating member, which objective is focused so that the images delivered to the image-exploiting unit, which is connected to said image-capturing unit, contain a representation of said micro-engravings allowing said micro-engravings to be identified and localized;

characterized in that:

said member for sending back light is a backscatterer;
said objective of said image-capturing unit is focused in order to deliver to the image-exploiting unit images of the backscatterer;
said point light source has a wavelength $\lambda$ comprised between 700 and 1000 nm; and
said collimating member has a focal length F and said point light source has a diameter D smaller than or equal to one fiftieth of the focal length F.

Thus, in the optical instrument according to the invention, the member for sending back light is not a reflector but a backscatterer, so that the light sent back toward the ophthalmic lens is no longer spatially coherent.

As a result, the beam sent back toward the ophthalmic lens, when it passes through the ophthalmic lens, is not affected by the micro-engravings.

Because, in the optical instrument according to the invention, the point light source has a wavelength comprised between 700 nm and 1000 nm, i.e. in the infrared near the spectrum of visible light, the attenuation of the light on its path between the point light source and the image-capturing unit is moderated, including when the ophthalmic lens is tinted.

Of course, the image-capturing unit is chosen to be sensitive in this wavelength range.

In addition to implementing a wavelength comprised in this range, the point light source of the optical instrument according to the invention has a diameter D smaller than or equal to one fiftieth of the focal length F of the collimating member.

Specifically, it has been observed that, with this wavelength range and with such a diameter D of the point light source, it is possible for a contrasted image of the micro-engravings to be projected onto the backscatterer.

It is believed that the contrasted character of the image is due to the fact that the transverse spatial coherence width of the beam of collimated light is a good match to the width of the micro-engravings.

Because of the contrasted character of the image, the aperture of the objective of the image-capturing unit may be relatively large.

Such an aperture limits the loss of light flux in the image-capturing unit.

Thus, the instrument according to the invention may allow a fluid exploitation of the micro-engravings. For example, if the image-exploiting unit is a displaying unit, the micro-engravings may be observed on the displaying unit while the user positions the ophthalmic lens on the holder.

It will be noted that, in contrast, in the prior-art optical instruments such as described in the aforementioned European patent applications EP 1 613 450 and EP 1 739 472, when the objective is focused on that face of the ophthalmic lens on which the micro-engravings are present, the image-capturing unit sees on this face the effect of light coming back from the reflector, this meaning that the captured images have a tendency to be blurry and that therefore the aperture of the objective of the image-capturing unit must be relatively small, this generating a substantial loss of light flux in the image-capturing unit.

Moreover, it will be noted that a method and an optical device for detecting defects in objects such as sheets of transparent material, and in which light is returned back toward the object by a backscatterer, are already known from European patent application EP 0 856 728.

The method and optical device described in this document make it possible to easily identify gross defects; hence they bear no relation to the identification and localization of micro-engravings present on an ophthalmic lens.

It will also be noted that European patent application EP 1 093 907 proposes to use the optical device of EP 0 856 728 to detect characteristics of an ophthalmic lens taking the form of printed marks or hidden marks. For the reasons indicated above, these hidden marks cannot be micro-engravings.

According to features that are advantageous, especially because of the micro-engraving identification and localization accuracy that they ensure, the optical instrument according to the invention is configured for micro-engravings having a width a comprised between 10 µm and 80 µm, the diameter D of said point light source and said focal length F of said collimating member respecting the relationship:

$$D \leq F\lambda/5a$$

where $\lambda$ is the wavelength of said point light source.

According to more particular advantageous features, ensuring an excellent micro-engraving identification and localization accuracy, the optical instrument according to the invention is configured for micro-engravings having a width a comprised between 30 µm and 60µ, $\lambda$ being comprised between 800 and 900 nm while F is comprised between 150 and 300 mm.

According to other advantageous features:
  said point light source is formed by an extended light source and by a diaphragm containing a pinhole placed facing said extended light source, the diameter of said pinhole thus forming the diameter D of said point light source;
  said optical instrument includes a half-silvered mirror on either side of which said point light source and said objective of said image-capturing unit are placed;
  said backscatterer is rotatable; and/or
  said optical instrument includes an image-analyzing device configured to identify and localize said micro-engravings, and a device for automatically positioning a centering pin on a face of said ophthalmic lens, which device is connected to said image-analyzing device.

According to advantageous features, the optical instrument furthermore includes:
  a device for driving the backscatterer to rotate, which is configured to make the backscatterer turn about a predetermined center of rotation;
  an aperture in said backscatterer, said aperture being configured so that the center of rotation of the backscatterer is elsewhere than in the aperture; and
  an assembly for receiving and analyzing light, which assembly is located on that side of the backscatterer which is opposite said holder, said holder, said backscatterer and said aperture being configured so that said assembly for receiving and analyzing light receives light from said beam of collimated light after it has passed through said ophthalmic lens and through said aperture, said assembly for receiving and analyzing light being configured to determine at least one optical characteristic of said ophthalmic lens.

Because the center of rotation of the backscatterer is not located in the aperture, no part of the aperture is centered on the center of rotation.

Therefore, any stationary point facing the backscatterer between its center of rotation and its periphery is in line, during at least part of each turn, with an unapertured section of the backscatterer.

The images of the backscatterer delivered to the image-exploiting unit therefore do not contain a void corresponding to the aperture and therefore allow the micro-engravings to be seen in their entirety.

It will be noted that document EP 1 997 585 describes an optical instrument in which the reflector of light is made up of two portions one of which, at the center, is stationary and the other of which, which is annular and of same center, is rotatable, the stationary portion of the reflector at the center being the top of an assembly for receiving and analyzing light.

In this optical instrument, the images displayed by the displaying unit contain a central void corresponding to the stationary portion of the reflector at the center. This void decreases the visibility of the marks located at the center of the ophthalmic lens.

According to advantageous features, the device for driving the backscatterer to rotate and the image-capturing unit are connected to a controlling device configured so that each time interval during which the image-capturing unit takes an image has a duration during which the backscatterer makes an integer number of turns.

According to alternative advantageous features, the device for driving the backscatterer to rotate and the point light source are connected to a controlling device configured so as to make said point light source emit flashes each having a duration during which the backscatterer makes an integer number of turns.

According to other advantageous features:
  said assembly for receiving and analyzing light includes a Hartmann matrix illuminated by said light of said beam of collimated light after it has passed through said ophthalmic lens and through said aperture; an additional image-capturing unit illuminated by the light after it has passed through the Hartmann matrix; and an analyzing device for analyzing the images captured by the additional image-capturing unit in order to determine said at least one optical characteristic of the ophthalmic lens;
said analyzing device for analyzing the images captured by the additional image-capturing unit is connected to a displaying unit in order to allow it to display said at least one optical characteristic of the ophthalmic lens;
said analyzing device for analyzing the images captured by the additional image-capturing unit is connected to a device for automatically positioning a centering pin on a face of said ophthalmic lens;
said backscatterer has a circular outline and said aperture takes the form of an angular sector; and/or
said backscatterer has a circular outline and said aperture is spiral shaped.

BRIEF DESCRIPTION OF THE DRAWINGS

The disclosure of the invention will now continue with a detailed description of embodiments thereof, given below by way of illustration and nonlimiting example, and with reference to the appended drawings. In said drawings.

DETAILED DESCRIPTION OF EMBODIMENTS

The optical instrument 10 illustrated in FIGS. 1 to 4 includes an assembly 11 for emitting and receiving light, a backscatterer 12 and a holder 13 (FIG. 1) that is configured to hold an ophthalmic lens 14 between the assembly 11 and the backscatterer 12 in a position in which its face 15 on which the micro-engravings 16 are present is facing the assembly 11 for emitting and receiving light.

Figure 1:
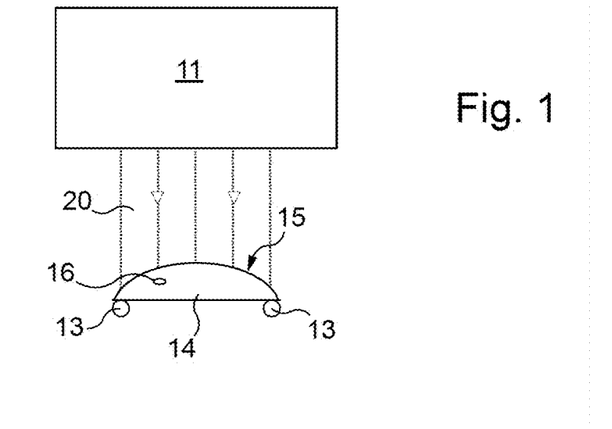
FIG. 1 is a very schematic view showing an assembly for emitting and receiving light and a holder that a first embodiment of an optical instrument according to the invention includes, an ophthalmic lens having micro-engravings on one of its faces being held on the holder in a position in which that face on which the micro-engravings are present is facing the assembly for emitting and receiving light.

The micro-engravings 16 are small local variations in lens thickness or small local variations in refractive index.

Various techniques allow micro-engravings 16 to be formed on a face of an ophthalmic lens: the micro-engravings may take the form of small additional thicknesses when they are molded with the ophthalmic lens, small recesses may be generated by laser or a laser may be used to modify the refractive index of the lens material locally.

When a coherent light beam encounters a micro-engraving 16, its phase is modified locally by the micro-engraving.

This local variation in phase causes the light beam to diffract.

In the case of a spatially coherent light beam, the diffraction is made visible by a local intensity modification (Fresnel diffraction).

The micro-engravings 16 serve to pinpoint characteristic points of the ophthalmic lens 14, for example its prism reference point (PRP).

The assembly 11 for emitting and receiving light emits a beam 20 (FIG. 1) of spatially coherent collimated light.

Figure 2:
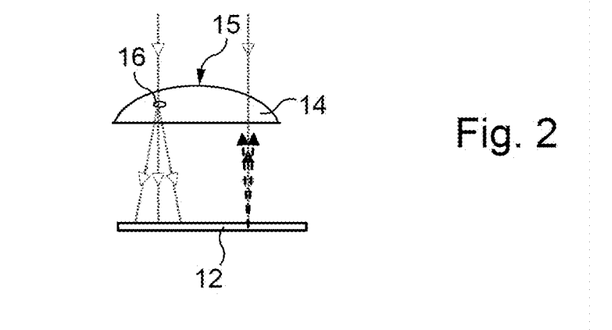
FIG. 2 is a very schematic view showing a backscatterer that this instrument includes and the ophthalmic lens held on the holder.

As shown on the left in FIG. 2, when the beam 20 encounters a micro-engraving 16, the light is diffracted locally.

After the light has passed through the lens 14, its projection on the backscatterer 12 contains intensity variations due to the diffraction of the light caused by the micro-engravings 16.

The image of the beam 20 projected onto the backscatterer 12 therefore contains intensity variations of similar shapes to those of the micro-engravings 16.

As shown on the right in FIG. 2, the light that reaches the backscatterer 12 is sent back thereby slightly scattered in the same direction.

The light beam 21 backscattered by the backscatterer is spatially incoherent because of this slight scattering.

Figure 3:
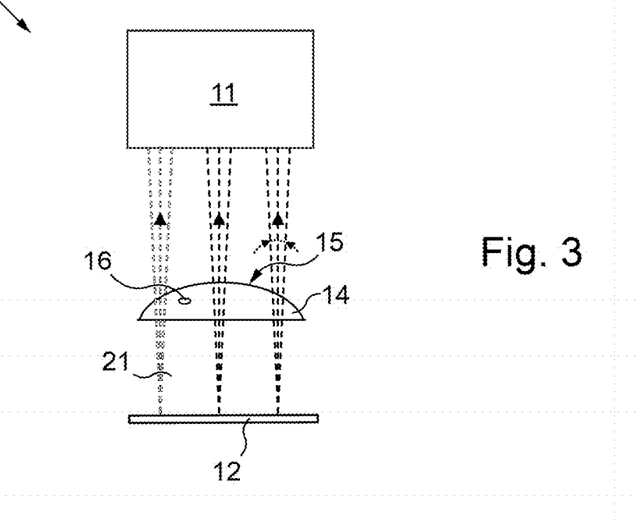
FIG. 3 is a very schematic view showing the assembly for emitting and receiving light, the ophthalmic lens and the backscatterer and the path of the light from the backscatterer to the assembly for emitting and receiving light.

As may be seen in FIG. 3, the light beam 21 thus emitted by the backscatterer 12 passes through the ophthalmic lens 14 without or almost without being modified by the micro-engravings 16, and reaches the assembly 11 for emitting and receiving light.

In the preceding description, the prismatic deviation that the incident beam 20 undergoes when it passes through the lens and that the beam 21 emitted by the backscatterer 12 undergoes when it once again passes through the lens was not mentioned.

This is because these two successive prismatic deviations cancel each other out perfectly.

Thus, whereas the image of the micro-engravings 16 formed on the backscatterer 12 is deformed by the prismatic deviation, the image of the backscatterer 12 seen through the ophthalmic lens 14 by the assembly 11 is deformed in exactly the inverse way.

Therefore, the image of the backscatterer 12 seen by the assembly 11 contains an exact representation of the micro-engravings 16.

The fact that the optical beam passing through the ophthalmic lens 14 is collimated and spatially coherent makes it possible to obtain a very contrasted projection of the micro-engravings 16 on the backscatterer 12.

The holder 13 is positioned so that the projection of the micro-engravings 16 on the backscatterer 12 is easy to observe: the distance between the ophthalmic lens 14 and the backscatterer 12 is sufficiently small for the projection on the backscatterer 12 to remain clear (if this distance is too large the image would be blurry because of the diffraction at the micro-engravings 16) and sufficiently large for the projection of the micro-engravings 16 to be large enough to be observed.

They assembly 11 for emitting and receiving light will now be described in detail with reference to FIG. 4.

In the illustrated example, the assembly 11 includes: an extended light source 25; a diaphragm 26 containing a pinhole 27; a half-silvered mirror 28; a redirecting mirror 29; a collimating lens 30; a video camera 31; and a displaying unit 32 connected to the video camera 31.

The diaphragm 26 and the objective 35 of the video camera 31 are located on either side of the half-silvered mirror 28, in conjugate places, i.e. they are seen from the point of view of the redirecting mirror 29 as being located in one and the same place.

This place is chosen to be the focal point of the collimating lens 30. Thus, each of the two conjugate places corresponds to the focal point of the collimating lens 30.

The pinhole 27 of the diaphragm 26 may therefore be considered to be placed at a first focal point of the collimating lens 30 and the objective 35 of the video camera 31 may be considered to be placed at a second focal point of the collimating lens 30.

The extended light source 25 is placed as close as possible to the diaphragm 26, for example less than 0.5 mm away, so that the pinhole 27 of the diaphragm 26 forms a point light source.

The light emitted by this point source reflects from the half-silvered mirror 28 then from the redirecting mirror 29 and passes through the collimating lens 30.

Because the pinhole 27 is located at the focal point of the collimating lens 30, the beam 20 emerging from the lens 30 is collimated, i.e. all its rays are oriented parallel to one another.

Figures 4, 5, 6, 7, 8:
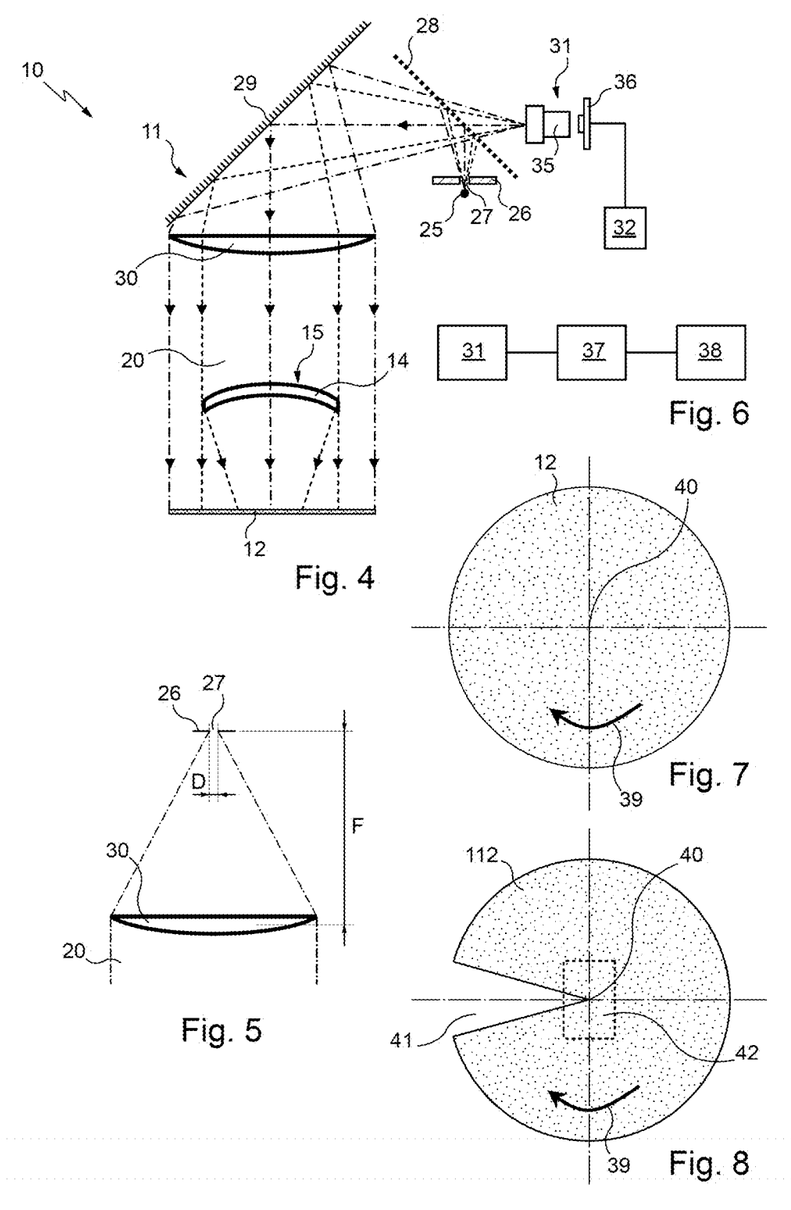
FIG. 4 is a schematic view of the first embodiment of the instrument according to the invention, showing in detail the assembly for emitting and receiving light.
FIG. 5 is a schematic view illustrating certain geometric features of the point light source and of the collimating member.
FIG. 6 is a block diagram showing elements connected to the image-capturing unit in order to allow a centering pin to be automatically positioned on the ophthalmic lens.
FIG. 7 is a plane view of the backscatterer.
FIG. 8 is a view similar to that in FIG. 7, but for a second embodiment of the optical instrument according to the invention.

FIG. 5 schematically shows the focal length F of the collimating lens 30 and the diameter D of the pinhole 27, i.e. the diameter of the point light source formed by the extended light source 25 and by the diaphragm 26.

In practice, the point light source may be formed by a commercially available component combining an LED forming the extended light source 25 and a diaphragm 26.

To ensure that the light flux is sufficient, the diameter D is at least 10 μm or even at least 20 μm. The maximum values provided for the diameter D are described below.

After it has passed through the ophthalmic lens 14, the light of the beam 21 issued from the backscatterer 12 then passes through the collimating lens 30, is reflected by the redirecting mirror 29, passes through the half-silvered mirror 28 and reaches the objective 35 of the video camera 31.

The objective is focused so that the sensor 36 of the video camera 31 takes images of the backscatterer 12.

These images are displayed on the displaying unit 32, which is connected to the video camera 31.

Thus, an observer looking at the displaying unit 32 sees images allowing the micro-engravings 16 present on the face 15 of the ophthalmic lens 14 to be identified and localized.

This makes it possible for an operator to determine where the micro-engravings 16 are on the ophthalmic lens 14 and therefore where the optical center and the axis of the spherical power of this ophthalmic lens are located, these parameters for example being useful to the operator when he wants to edge the ophthalmic lens 14, i.e. cut the edges of the ophthalmic lens 14 to the shape of the frame in which it must be fitted.

In practice, the centering pin used to attach the ophthalmic lens 15 to the edging machine is placed in the instrument 10 by virtue of the micro-engravings 16 thus viewed. The centering pin may be placed manually by the operator.

FIG. 6 shows elements allowing the centering pin to be placed automatically.

In addition to being connected to the displaying unit 32, the video camera 31 is connected to an image-analyzing device 37 that is capable of identifying and localizing the micro-engravings 16. A device 38 for automatically positioning a centering pin is connected to the device 37, which delivers to the device 38 the coordinates of that place on the face 15 of the ophthalmic lens 14 on which the centering pin must be placed.

The device 38 for automatically positioning a centering pin is for example such as described in French patent application 2 825 466, which corresponds to U.S. Pat. No. 6,888,626.

Generally, it is advantageous for the extended light source 25 and therefore the point light source that it forms with the diaphragm 26, to have a wavelength comprised between 700 nm and 1000 nm, i.e. in the infrared near the spectrum of visible light.

Thus, the attenuation of the light on its path between the pinhole 27 and the sensor 36 of the video camera 31 is moderated, including when the ophthalmic lens 14 is tinted.

Of course, the sensor 36 of the video camera 31 is chosen to be sensitive in this wavelength range.

Generally, the instrument 10 is here configured for micro-engravings 16 the width of which is comprised between 10 and 80 μm.

It is important for the image of the micro-engravings 16 projected onto the backscatterer 12 to be contrasted. Specifically, this makes it possible to use a video camera 31 with an aperture 35 of relatively large size. Such an aperture limits the loss of light flux on route to the sensor 36 of the video camera 31.

Thus, enough light flux is received by the sensor 36 of the video camera 31 to allow a fluid observation of the micro-engravings 16, i.e. the user may move the ophthalmic lens 14 over the holder 13 while the displaying unit 32 is refreshed in real time (in practice, at a frequency at least equal to 15 Hz).

It has been observed that with the aforementioned range of wavelengths, a pinhole 27 with a diameter D smaller than or equal to one fiftieth of the focal length F of the collimating lens 30 (distance between the lens 30 and its focal point) makes it possible to ensure that the image of the micro-engravings 16 projected onto the backscatterer 12 is contrasted.

It is believed that this is the result of the good match between the transverse spatial coherence width of the beam 20 and the width of the micro-engravings 16.

Generally, given the aforementioned lower limit of 10 μm for the width of the micro-engravings, it is advantageous for the transverse spatial coherence width of the beam 20 to be larger than or equal to 5 times the width of the micro-engravings 16.

By definition, the transverse spatial coherence width is equal to $F\lambda/D$, where $\lambda$ is the wavelength of the light flux.

If the width of the micro-engravings is denoted a, the following relationship is obtained: $D \leq F\lambda/5a$ For example, if:

the width of the micro-engravings is 50 µm;
the wavelength of the light flux is 850 nm; and
the focal length of the collimating lens 30 is 200 mm, then the diameter D of the pinhole 27 is smaller than or equal to 680 µm.

It has been observed that excellent results are obtained for micro-engravings 16 having a width a comprised between 30 µm and 60 µm when the wavelength of the light flux $\lambda$ is comprised between 800 and 900 µm and the focal length F is comprised between 150 and 300 mm.

As indicated above, with a light source 25 emitting at a wavelength comprised between 700 nm and 1000 nm, and a light-source diameter D smaller than or equal to one fiftieth of the focal length F of the collimating lens 30, the image of the micro-engravings 16 projected onto the backscatterer 12 is well contrasted.

Depending on the circumstances, the diameter D is selected to be smaller than or equal to one hundredth, one hundred and fiftieth, one two hundredth or one two hundred and fiftieth of the focal length F.

It has also been observed that parameters favorable to making the light flux received by the sensor 36 of the video camera 31 sufficient are:

a high intensity of the light flux emitted through the pinhole 27 of the diaphragm 26; and/or an aperture of the objective 35 in accordance with the scattering angle of the light scattered by the backscatterer 12 (see FIG. 3 and the right-hand portion of FIG. 2).

As shown in FIG. 7 by the arrow 39, to average graininess, the backscatterer 12 is rotated during use of the instrument 10.

It is also possible to place calibrating patterns on the backscatterer 12 (it will be recalled here that the objective 35 of the video camera 31 is focused on the backscatterer 12 and that it is therefore the backscatterer 12 that is seen, moreover whether an ophthalmic lens 14 is present or not), such calibrating patterns no longer being perceptible when the backscatterer is rapidly rotating.

It will be noted that micro-engravings such as 16 are more precise than the marks borne by ophthalmic lenses as supplied by their manufacturers; and that the instrument according to the invention allows the micro-engravings to be used directly, to the benefit of precision.

Such a precision, for example for the centering, is important since lenses are becoming increasingly personalized.

It will be noted that the instrument 10 is easily integratable into an already existing instrument, for example a reader-blocker or a grinder.

It will also be noted that one possible use of the instrument according to the invention is to measure any shift between a reference given by the micro-engravings and other reference marks present on the lens, for example the marks with which the lens is delivered; and/or that another possible use of the instrument according to the invention is to produce marks very precisely with respect to the micro-engravings by virtue of a read-out with the instrument 10.

In the embodiment of the instrument 10 that was just described, the backscatterer 12 is formed by an unapertured rotatable platen, i.e. a platen containing no aperture.

A second embodiment of the optical instrument according to the invention, in which the backscatterer 12 is replaced by a backscatterer containing an aperture and the assembly for receiving and analyzing light is placed under this backscatterer, i.e. on that side of the backscatterer which is opposite the holder 13 provided to hold the ophthalmic lens 14, will now be described with reference to FIGS. 8 to 13.

Figure 9:
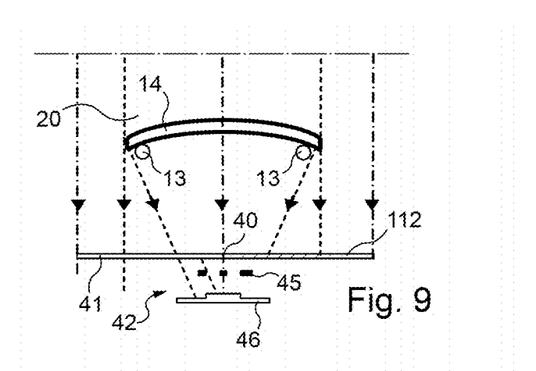
FIG. 9 is a schematic view similar to the bottom part of FIG. 4, but for the second embodiment of the optical instrument according to the invention.

The holder 13, the aperture in the backscatterer and the assembly for receiving and analyzing light are configured so that the latter receives light from the beam 20 of collimated light after said light has passed through the ophthalmic lens 14 and through the aperture in the backscatterer.

The received light is analyzed to determine certain optical data of the ophthalmic lens 14, in particular its optical center and axis of cylindrical power, which data are of use if the ophthalmic lens 14 is to be edged, or even to determine other data such as the spherical power and cylindrical power.

Figure 10:
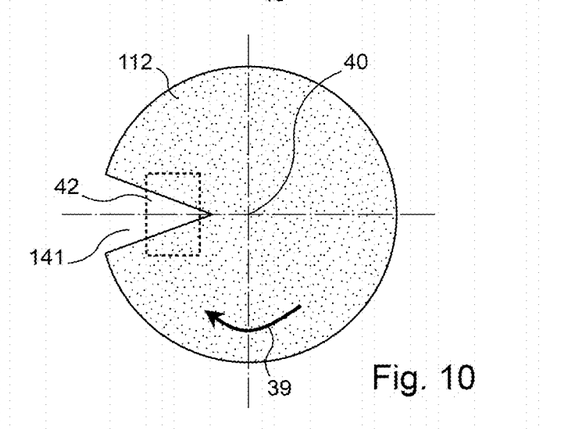
FIG. 10 is a view similar to that in FIG. 8, but for a first variant of the second embodiment of the optical instrument according to the invention.
Figure 11:
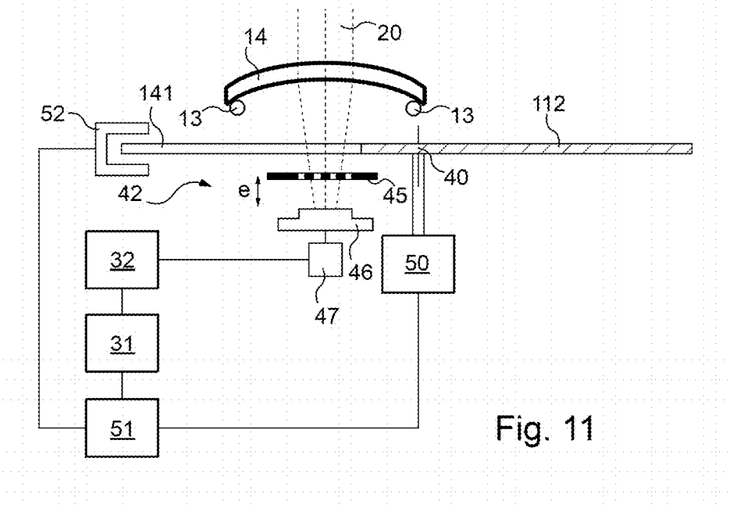
FIG. 11 is a view similar to that in FIG. 9 but showing more detail and corresponding to the first variant illustrated in FIG. 10.
Figure 12:
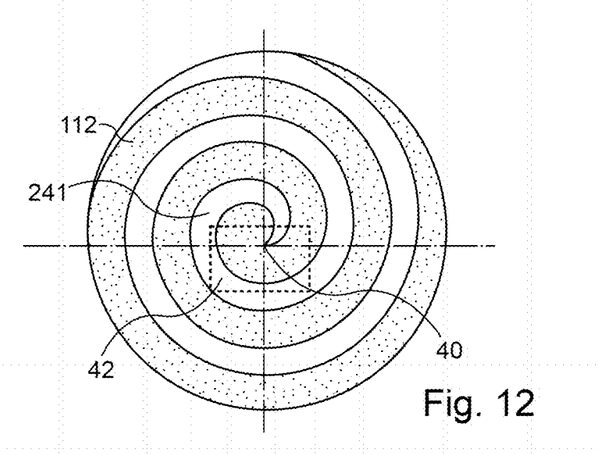
FIG. 12 is a view similar to those in FIGS. 8 and 10, but for a second variant of the second embodiment of the optical instrument according to the invention.

A first version of the optical instrument according to the second embodiment is illustrated in FIGS. 8 and 9, a second version in FIGS. 10 and 11 and a third version in FIG. 12.

Figure 13:
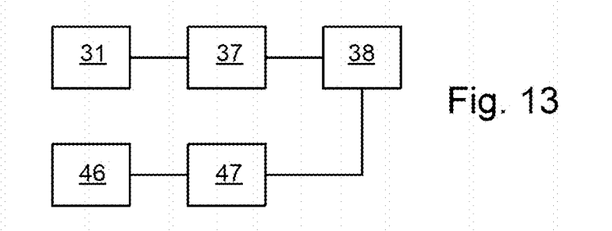
FIG. 13 is a block diagram showing elements connected to the image-capturing units of the second embodiment of the optical instrument according to the invention.
Figure 14:
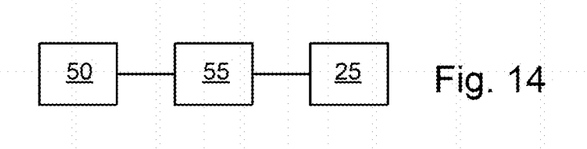
FIG. 14 is a block diagram showing elements connected to the light source in a version in which it emits flashes.

Elements common to the three versions are illustrated in FIGS. 11, 13 and 14

In each of the first, second and third versions, the backscatterer 12 is replaced by a backscatterer 112.

Just like the backscatterer 12, the backscatterer 112 has a circular outline centered on the center of rotation 40, but it has an aperture 41, an aperture 141 and an aperture 241, respectively.

In the first version illustrated in FIGS. 8 and 9, the aperture 41 takes the form of an angular sector. It extends from the center of rotation 40 to the periphery of the backscatterer 112.

As may be seen in FIG. 8, the assembly 42 for receiving and analyzing light is placed centered on the center of rotation 40.

As may be seen in FIG. 9, the holder 13 for the ophthalmic lens 14 is placed centered with respect to the center of rotation 40.

After light from the beam 20 of collimated light has passed through the ophthalmic lens 14 and through the aperture 41, it reaches the assembly 42 for receiving and analyzing light.

As will be understood in light of FIG. 8, at any instant a portion of the assembly 42 for receiving and analyzing light is in line with the aperture 41.

Thus, at any instant, a section of the assembly 42 for receiving and analyzing light receives light that has passed through the aperture 41.

Because of the rotary movement of the backscatterer 112, each section of the assembly 42 for receiving and analyzing light is, at a certain moment, in line with the aperture 41 when the backscatterer 112 makes a turn.

Therefore, on each turn of the backscatterer 112, the entirety of the assembly 42 for receiving and analyzing light receives light that has passed through the ophthalmic lens 14 and through the aperture 41.

Thus, on each turn of the backscatterer 112, the assembly 42 for receiving and analyzing light receives light that has passed through the entirety of the corresponding zone of the ophthalmic lens 14.

By analyzing the light received during at least one turn of the backscatterer 112, the assembly 42 for receiving and analyzing light is able to determine optical data of the lens 14, and more precisely of the zone through which the light passed before reaching the assembly 42 for receiving and analyzing light.

Because the center of rotation 40 is not located in the aperture 41 (the center 40 is here on the perimeter of the aperture 41), no part of the aperture 41 is centered on the center of rotation 40.

Therefore, any stationary point facing the backscatterer 112 between its center of rotation 41 and its periphery is in line, during part of each turn, with a section of the backscatterer 112 not forming part of the aperture 41, i.e. an unapertured portion.

Here, where the aperture 41 takes the form of an angular sector having its apex at the center of rotation 40 and an angular aperture of 30°, each stationary point is in line with the aperture 41 during 1/12 (30/360) of a turn and therefore in line with a section of the backscatterer 112 not forming part of the aperture 41 during 11/12 of a turn.

The images of the backscatterer 112 displayed by the displaying unit 32 therefore do not contain a void corresponding to the aperture 41 and therefore allow the micro-engravings 16 to be seen in their entirety.

Measurements that make it possible to prevent the aperture 41 from appearing at all on the displaying unit 32 will be described below with reference to FIG. 11 and with reference to FIG. 14.

The second version of the optical instrument according to the second embodiment illustrated in FIGS. 9 and 10 is a variant of the first version in which the aperture 41 is replaced by an aperture 141 that also takes the form of an angular sector, but the apex of which is a distance away from the center of rotation 40; furthermore, the assembly 42 for receiving and analyzing light is off-center with respect to the center of rotation 40, as is the holder 13 provided to hold the ophthalmic lens 14; the holder 13 and the assembly 42 for receiving and analyzing light are centered one relative to the other.

After light from the beam 20 of collimated light has passed through the ophthalmic lens 14 and through the aperture 141, it reaches the assembly 42 for receiving and analyzing light.

As will be understood in light of FIG. 10, at any instant a portion of the assembly 42 for receiving and analyzing light is in line with the aperture 141.

Thus, at any instant, a section of the assembly 42 for receiving and analyzing light receives light that has passed through the aperture 141.

Because of the rotary movement of the backscatterer 112, each section of the assembly 42 for receiving and analyzing light is, at a certain moment, in line with the aperture 141 when the backscatterer 112 makes a turn.

Therefore, on each turn of the backscatterer 112, the entirety of the assembly 42 for receiving and analyzing light receives light that has passed through the ophthalmic lens 14 and through the aperture 141.

Thus, on each turn of the backscatterer 112, the assembly 42 for receiving and analyzing light receives light that has passed through the entirety of the corresponding zone of the ophthalmic lens 14.

Because the center of rotation 40 is not located in the aperture 141, no part of the aperture 141 is centered on the center of rotation 40.

For the same reasons as those explained above for the aperture 41, the images of the backscatterer 112 containing the aperture 141 and displayed by the displaying unit 32 do not contain a void corresponding to the aperture 141 and therefore allow the micro-engravings 16 of the ophthalmic lens 14 to be seen in their entirety.

The third version of the optical instrument according to the second embodiment, which version is illustrated in FIG. 12, is a variant of the first version in which the aperture 41 is replaced by an aperture 241 that is spiral shaped; furthermore, the assembly 42 for receiving and analyzing light is off-center with respect to the center of rotation 40, as is the holder 13 provided to hold the ophthalmic lens 14; the holder 13 and the assembly 42 for receiving and analyzing light are centered with relative to the other.

After light from the beam 20 of collimated light has passed through the ophthalmic lens 14 and through the aperture 241, it reaches the assembly 42 for receiving and analyzing light.

As will be understood in light of FIG. 12, at any instant a portion of the assembly 42 for receiving and analyzing light is in line with the aperture 241.

Thus, at any instant, a section of the assembly 42 for receiving and analyzing light receives light that has passed through the aperture 241.

Because of the rotary movement of the backscatterer 112, each section of the assembly 42 for receiving and analyzing light is, at a certain moment, in line with the aperture 241 when the backscatterer 112 makes a turn.

Therefore, on each turn of the backscatterer 112, the entirety of the assembly 42 for receiving and analyzing light receives light that has passed through the ophthalmic lens 14 and through the aperture 241.

Thus, on each turn of the backscatterer 112, the assembly 42 for receiving and analyzing light receives light that has passed through the entirety of the corresponding zone of the ophthalmic lens 14.

Because the center of rotation 40 is not located in the aperture 241, no part of the aperture 141 is centered on the center of rotation 40.

For the same reasons as those explained above for the aperture 41, the images of the backscatterer 112 containing the aperture 241 and displayed by the displaying unit 32 do not contain a void corresponding to the aperture 241 and therefore allow the micro-engravings 16 of the ophthalmic lens 14 to be seen in their entirety.

As may be seen in FIGS. 9 and 11, the assembly 42 for receiving and analyzing light includes a Hartmann matrix 45 and an image sensor 46 placed at a predetermined distance e (FIG. 11) from the Hartmann matrix 45.

The Hartmann matrix 45 is an opaque plate pierced with holes at regular intervals, so that the image captured by the sensor 46 is a matrix of luminous dots each corresponding to one hole of the matrix 45, the locations of these luminous dots depending on the optical characteristics of the ophthalmic lens 14.

Analysis of the image captured by the image sensor 46 therefore makes it possible, for example via the Hartmann or Shack-Hartmann deflectometry method, to determine optical characteristics of the ophthalmic lens 14, especially its optical center, the axis of its cylindrical power, its spherical power, its cylindrical power and other characteristics. For more details, the reader may for example refer to French patent application 2 825 466 which corresponds to the U.S. Pat. No. 6,888,626, or to international patent application WO 95/34800.

As may be seen in FIG. 11, the image sensor 46 is connected to an image-analyzing device 47 that is capable of determining the optical characteristics of the ophthalmic lens 14.

The image-analyzing device 47 is connected to the displaying unit 32 that may thus display the optical characteristics of the ophthalmic lens 14 determined by the image-analyzing device 47.

As shown in FIG. 13, in the second embodiment of the optical instrument according to the invention, the device 38 for positioning a centering pin is connected not only to the image-analyzing device 37, but also to the image-analyzing device 47, this meaning that the device 38 for automatically positioning a centering pin may obtain the coordinates of the place on the face 15 of the ophthalmic lens 14 on which the centering pin must be placed not only by way of the micro-engravings 16 but also by way of the optical characteristics of the lens 14.

FIG. 11 schematically shows the device 50 for driving the backscatterer 122 to rotate, which device is configured to make the backscatterer 122 turn about the center of rotation 40.

With reference to FIG. 11, it will now be explained how it is possible to prevent a void corresponding to the aperture such as 41, 141 or 241 from appearing on the displaying unit 32.

The video camera 31 and the device 50 for driving the backscatterer 112 to rotate are connected to a controlling device 51 configured so that each time interval during which the video camera 31 takes an image corresponds to an integer number of turns of the backscatterer 112.

In the illustrated example, each image is taken during 1/20 s and the backscatterer 112 makes one turn in 1/20 s, i.e. at a speed of 1200 rotations/mn.

As explained above, because the center of rotation 40 is not located in the aperture such as 41, 141 or 241, no part of these apertures is centered on the center of rotation 40.

Therefore, any stationary point facing the backscatterer 112 between its center of rotation 40 and its periphery is in line, during part of each turn, with a section of the backscatterer 112 not forming part of the aperture (unapertured section).

Likewise, each pixel of the sensor 36 of the video camera 31 receives, during part of each turn, light from a section of the backscatterer 112 not forming part of the aperture.

As each image is taken during one or more integer turns of the backscatterer 112, each pixel receives the same proportion of the light coming from the section of the backscatterer 112 not forming part of the aperture such as 41, 141 or 241.

Each image taken by the video camera 31 therefore does not include any void corresponding to the aperture such as 41, 141 or 241.

An operator looking at the displaying unit 32 sees the same images as with the unapertured backscatterer 12, except that all or some of backscatterer 112 appears less bright.

For example, for the backscatterer 112 having the aperture 41 shown in FIGS. 8 and 9, the perceived brightness of the backscatterer 112 in its entirety is 11/12 the perceived brightness of the backscatterer 12, all else moreover being equal.

The backscatterer 112 having the aperture 41 shown in FIGS. 8 and 9 is thus perceived as an entirely unapertured backscatterer (just like the backscatterer 12) while still letting light pass to the unit 42 for receiving and analyzing light.

For the backscatterer 112 having the aperture 141 shown in FIGS. 10 and 11, a central section, the radius of which corresponds to the distance between the center of rotation 40 and the apex of the aperture 141, is perceived with the same brightness as the backscatterer 12 whereas the rest of the backscatterer 112 is perceived to be less bright.

In all these cases, the image of the backscatterer 112 allows the micro-engravings 16 to be seen in their entirety.

The implementation of the controlling device 51 for example involves a common time-base generator for controlling the video camera 31 and the rotation-driving device 50.

In the example illustrated in FIG. 11, provision is also made for a detector 52 for determining the position of the backscatterer 112 in order to allow its speed of rotation to be automatically controlled.

As a variant, as illustrated in FIG. 14, rather than providing a controlling device such as 51 to control the video camera 31 and the device 50 for driving the backscatterer 12 to rotate, provision is made for a device 55 connected to the device 50 for driving the backscatterer 112 to rotate and to the extended light source 25 of the point light source formed by the extended light source 25 and by the diaphragm 26.

The controlling device 55 is configured to make the light source 25 emits flashes, each time interval during which the light source 25 emits a flash corresponding to an integer number of turns of the backscatterer 112.

For example, if the backscatterer 112 turns at a speed of 1200 rotations/mn, and therefore makes one turn every 1/20 s, each flash has a duration of 1/20 s or of a multiple of 1/20 s.

Since no light is emitted between the flashes, only the moments when a flash is emitted appear on the displaying unit 32.

As each moment in which an image appears on the displaying unit 32 lasts one or more integer turns of the backscatterer 112, each displayed image contains no void corresponding to the aperture such as 41, 141 or 241.

An operator looking at the displaying unit 32 sees the same images as with a controlling device such as 51, except that the images have a brightness that oscillates with the rhythm of the flashes emitted by the light source 25.

The implementation of the controlling device 55 for example involves a common time-base generator for controlling the flashes of the light source 25 and the rotation-driving device 50.

Generally, a suitable range of rotation for the backscatterer 12 or the backscatterer 112 is between 600 and 5000 rotations/mn.

In variants (not illustrated) of the second embodiment of the optical instrument according to the invention, the aperture 41, 141 or 241 is replaced by an aperture of different shape/form not containing the center of rotation 40, for example an aperture not extending as far as the periphery of the backscatterer 112 or an aperture the outline of which is larger than the assembly 42 for receiving and analyzing light; and/or is replaced by a plurality of apertures.

In variants (not illustrated) of the first and second embodiment of the optical instrument according to the invention:
  there is no redirecting mirror such as 29 or the mirror 29 is replaced by a curved mirror conjointly playing the role of the mirror 29 and of the collimating lens 30;
  the point light source is configured differently, for example it is a laser emitting a pencil beam of predetermined diameter;
  the collimating lens is replaced by a different collimating member, for example made up of a plurality of lenses;
  the video camera 31 is replaced by another image-capturing unit;
  the displaying unit 32 is replaced by another image-exploiting unit, for example an image-analyzing device such as 37; and/or
  the micro-engravings such as 16 are placed elsewhere than on the front face such as 15, for example on the back face or in the thickness of the lens.

Many other variants are possible depending on the circumstances and it will be recalled, in this respect, that the invention is not limited to the examples described and shown.

The invention claimed is:

1. An optical instrument for identifying and localizing micro-engravings (16) present on an ophthalmic lens (14), including:
    a point light source;
    a collimating member (30), said point light source being placed at a first focal point of said collimating member (30) so that light issued from said point light source becomes, after having passed through said collimating member, a beam (20) of collimated light;
    a member for sending back light;
    a holder (13) configured to hold said ophthalmic lens (14) between said collimating member (30) and said member for sending back light; said collimating member (30), said holder (13) and said member for sending back light are placed so that the beam (20) of collimated light issued from said collimating member (30) encounters the location (15) on the ophthalmic lens (14) where micro-engravings (16) are present, passes through said ophthalmic lens (14), encounters said member for sending back light, returns toward said ophthalmic lens (14) and once again passes through said ophthalmic lens (14) then said collimating member (30);
    an image-exploiting unit (32); and
    an image-capturing unit (31) connected to said image-exploiting unit (32), which image-capturing unit (31) includes an objective (35) placed at a second focal point of said collimating member, which objective is focused so that the images delivered to the image-exploiting unit (32), which is connected to said image-capturing unit (31), contain a representation of said micro-engravings (16) allowing said micro-engravings (16) to be identified and localized;
    wherein:
    said member for sending back light is a backscatterer (12);
    said objective (35) of said image-capturing unit (31) is focused in order to deliver to the image-exploiting unit (32) images of the backscatterer (12);
    said point light source (25-27) has a wavelength (A) comprised between 700 and 1000 nm; and
    said collimating member has a focal length (F) and said point light source (25-27) has a diameter (D) smaller than or equal to one fiftieth of the focal length (F) of said collimating member.

2. The instrument as claimed in claim 1, wherein the instrument is configured for micro-engravings (16) having a width (a) comprised between 10 μm and 80 μm, the diameter (D) of said point light source (25-27) and said focal length (F) of said collimating member (30) respecting the relationship:

$$D \leq F\lambda/5a$$

where
D is the diameter of said point light source,
F is the focal length of the collimating member,
λ is the wavelength of said point light source (25-27), and
a is the width of the micro-engravings.

3. The instrument as claimed in claim 2, wherein the instrument is configured for micro-engravings (16) having a width a comprised between 30 μm and 60 μm, the wavelength of said point light source (25-27) (λ) being comprised between 800 and 900 nm while the focal length of the collimating member (F) is comprised between 150 and 300 mm.

4. The instrument as claimed in claim 1, wherein the instrument is configured for micro-engravings (16) having a width a comprised between 30 μm and 60 μm, the wavelength of said point light source (25-27) (λ) being comprised between 800 and 900 nm while the focal length of the collimating member (F) is comprised between 150 and 300 mm.

5. The instrument as claimed in claim 1, wherein said point light source is formed by an extended light source (25) and by a diaphragm (26) containing a pinhole (27) placed facing said extended light source (25), the diameter of said pinhole (27) thus forming the diameter (D) of said point light source.

6. The instrument as claimed in claim 1, wherein the instrument includes a half-silvered mirror (28) on either side of which said point light source (25-27) and said objective (35) of said image-capturing unit (31) are placed.

7. The instrument as claimed in claim 1, wherein said backscatterer (12) is rotatable.

8. The instrument as claimed in claim 1, wherein the instrument includes an image-analyzing device (37) configured to identify and localize said micro-engravings (16), and a pin centering device (38) arranged for automatically positioning a centering pin on a face (15) of said ophthalmic lens (14), the pin centering device (38) device being connected to said image-analyzing device (37).

9. The instrument as claimed in claim 1, further comprising:
    a rotation-driving device (50) for driving the backscatterer (112) to rotate being connected to a predetermined center of rotation (40) of the backscatterer (112) so that the rotation-driving device (50) turns the backscatterer (112) about the predetermined center of rotation (40);
    an aperture (41; 141; 241) in said backscatterer (112), said aperture (41; 141; 241) being configured so that the center of rotation (40) of the backscatterer (112) is elsewhere than in the aperture (41; 141; 241); and
    an assembly (42) for receiving and analyzing light, which assembly is located on that side of the backscatterer (112) which is opposite said holder (13), said holder (13), said backscatterer (112) and said aperture (41; 141; 241) being configured so that said assembly (42) for receiving and analyzing light receives light from said beam (20) of collimated light after it has passed through said ophthalmic lens and through said aperture (41; 141; 241), said assembly (42) for receiving and analyzing light being configured to determine at least one optical characteristic of said ophthalmic lens (14).

10. The instrument as claimed in claim 9, wherein the rotation-driving device (50) for driving the backscatterer (112) to rotate and the image-capturing unit (31) are connected to a controlling device (51) configured so that each time interval during which the image-capturing unit (31) takes an image has a duration during which the backscatterer (112) makes an integer number of turns.

11. The instrument as claimed in claim 10, wherein said assembly (42) for receiving and analyzing light includes a Hartmann matrix (45) illuminated by said light of said beam (20) of collimated light after it has passed through said ophthalmic lens (14) and through said aperture (41; 141; 241); an additional image-capturing unit (46) illuminated by the light after it has passed through the Hartmann matrix (45); and an analyzing device (47) for analyzing the images captured by the additional image-capturing unit (46) in order to determine said at least one optical characteristic of the ophthalmic lens (14).

12. The instrument as claimed in claim 10, wherein said analyzing device (47) for analyzing the images captured by the additional image-capturing unit (46) is connected to a displaying unit (32) in order to allow it to display said at least one optical characteristic of the ophthalmic lens (14).

13. The instrument as claimed in claim 10, wherein said analyzing device (47) for analyzing the images captured by the additional image-capturing unit (46) is connected to a pin centering device (38) for automatically positioning a centering pin on a face (15) of said ophthalmic lens (14).

14. The instrument as claimed in claim 9, wherein the rotation-driving device (50) for driving the backscatterer (112) to rotate and the point light source (25-27) are connected to a controlling device (55) configured so as to make said point light source (25-27) emit flashes each having a duration during which the backscatterer (112) makes an integer number of turns.

15. The instrument as claimed in claim 14, wherein said assembly (42) for receiving and analyzing light includes a Hartmann matrix (45) illuminated by said light of said beam (20) of collimated light after it has passed through said ophthalmic lens (14) and through said aperture (41; 141; 241); an additional image-capturing unit (46) illuminated by the light after it has passed through the Hartmann matrix (45); and an analyzing device (47) for analyzing the images captured by the additional image-capturing unit (46) in order to determine said at least one optical characteristic of the ophthalmic lens (14).

16. The instrument as claimed in claim 9, wherein said assembly (42) for receiving and analyzing light includes a Hartmann matrix (45) illuminated by said light of said beam (20) of collimated light after it has passed through said ophthalmic lens (14) and through said aperture (41; 141; 241); an additional image-capturing unit (46) illuminated by the light after it has passed through the Hartmann matrix (45); and an analyzing device (47) for analyzing the images captured by the additional image-capturing unit (46) in order to determine said at least one optical characteristic of the ophthalmic lens (14).

17. The instrument as claimed in claim 9, wherein said analyzing device (47) for analyzing the images captured by the additional image-capturing unit (46) is connected to a displaying unit (32) in order to allow it to display said at least one optical characteristic of the ophthalmic lens (14).

18. The instrument as claimed in claim 9, wherein said analyzing device (47) for analyzing the images captured by the additional image-capturing unit (46) is connected to a pin centering device (38) for automatically positioning a centering pin on a face (15) of said ophthalmic lens (14).

19. The instrument as claimed in claim 9, wherein said backscatterer (112) has a circular outline and said aperture (41; 141) takes the form of an angular sector.

20. The instrument as claimed in claim 9, wherein said backscatterer (112) has a circular outline and said aperture (241) is spiral shaped.

* * * * *